United States Patent Office 3,803,219
Patented Apr. 9, 1974

3,803,219
NOVEL CYCLOPENTENE DERIVATIVES
Maurits Eduard Vandewalle, Ghent, Belgium, assignor to Pfizer Inc., New York, N.Y.
No Drawing. Filed Nov. 18, 1970, Ser. No. 90,870
Claims priority, application Great Britain, Nov. 24, 1969, 57,302/69
Int. Cl. C07c 61/36
U.S. Cl. 260—514 K       3 Claims

ABSTRACT OF THE DISCLOSURE

Novel 2 - substituted 3,5,5-trialkoxy-cyclopent-2-en-1-ones are disclosed, valuable as intermediates in chemical synthesis.

BACKGROUND OF THE INVENTION

The compounds of the invention are valuable intermediates in the synthesis of 3-substituted cyclopentan-1,2-diones, and 2,3-substituted cyclopent-2-en-1,4-diones which are useful as intermediates in the synthesis of jasmone-like compounds, pyrethrins, prostaglandins, jasmonates and bitter principles of hops.

SUMMARY OF THE INVENTION

This invention relates to novel 2-substituted 3,5,5-trialkoxy-cyclopent-2-en-1-ones having the formula:

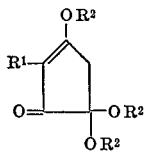

wherein —$R^1$ is selected from the group consisting of lower alkyl, alkenyl, alkynyl, 3,3-diphenyl-allyl, methoxy-lower alkyl, and 6-carboxyhexyl, said lower alkyl, alkenyl, and alkynyl having from 1 to 7 carbon atoms; and wherein —$R^2$ is methyl or ethyl.

The compounds of the invention are useful in the preparation of 3-substituted cyclopentan-1,2-diones, and 2,3-substituted cyclopent-2-en-1,4-diones and their 1-ketals.

The invention relates to cyclopentane and cyclopentene derivatives, and in particular is concerned with the preparation of 3-substituted cyclopentan-1,2-diones and 2,3-substituted cyclopent-2-en-1,4-diones from novel intermediates.

The novel intermediates provided by the invention are 2-substituted 3,5,5-trialkoxy-cyclopent-2-en-1-ones having the general formula:

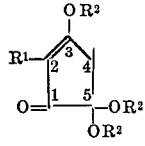

where $R^1$ is a primary aliphatic or aryl-substituted aliphatic group and $R^2$ is a lower (i.e., $C_{1-5}$) alkyl group.

By the term "primary" is meant a group which terminates in a methylene group. Included among such groups are saturated and unsaturated hydrocarbon groups, which may be straight or branched chain or cyclic in structure, and which may carry substituent groups including alkoxy, carboxy and aryl (e.g. phenyl) groups, on carbon atoms other than that of the terminal methylene group.

Typical among such groups are methyl, ethyl, propyl, n-butyl, iso-butyl, iso-amyl (3-methyl-butyl) or any other primary alkyl; allyl, 3-methyl-2-butenyl or any other primary alkenyl; propargyl or any other primary alkynyl; cyclohexyl-methyl or any other cycloalkyl-substituted primary alkyl; benzyl, phenethyl, cinnamyl or 3,3-diphenyl-allyl; 2-methoxy-ethyl, 7-methoxy-heptyl or any other alkoxy-substituted primary alkyl; and 6-carboxy-hexyl or any other carboxy-substituted primary alkyl or alkenyl.

Compounds of Formula I are useful intermediates for the synthesis of a variety of cyclopentene derivatives, and in particular for the synthesis of:

(A) 3 - substituted cyclopentan - 1,2-diones (or 2-hydroxy-pent-2-en-1-ones) having the tautomeric formulae:

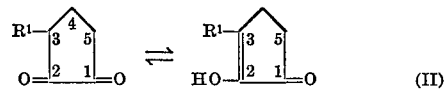

those in which $R^1$ is methyl or ethyl being known natural constituents of roasted coffee and useful as artificial flavour enhancing substances, and these and others being useful as intermediates in the synthesis of jasmone and jasmone analogues, having the general formula:

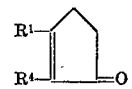

where $R^4$ is an alkyl or alkenyl group;

(B) 2,3 - substituted cyclopent - 2-en-1,4-diones and their 1-ketals having the general formulae:

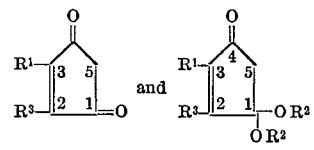

(IIIa)        (IIIb)

According to the nature of the group $R^3$, the Compounds (B) are structurally related to important natural products, such as the pyrethrins, the prostaglandins, the bitter principles of hops, methyl jasmonate and calythrone, and are useful in the synthesis of such products and analogues thereof, having the following general formulae:

Pyrethrins and analogues thereof:

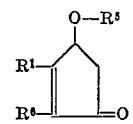

where $R^1$ is alkyl, e.g. methyl, $R^6$ is an aliphatic hydrocarbon radical which may be unsaturated, e.g. allyl,2-butenyl, 2-pentenyl, or 2,4-pentadienyl, and $R^5$ is an acid radical, e.g. a chrysanthemic or pyrethric acid radical.

Prostaglandins and analogues thereof:

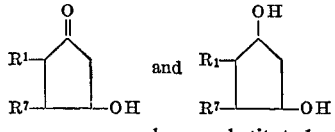

where $R^1$ is an omega-carboxy-substituted aliphatic hydrocarbon radical which may be unsaturated, e.g. 6-carboxy-hexyl or 6-carboxy-2-hexenyl, and $R^7$ is a 3-hydroxy-substituted aliphatic hydrocarbon radical which may be unsaturated, e.g. 3-hydroxy-octyl, 3-hydroxy-1-octenyl, 3-hydroxy-1,5-octadienyl.

Bitter principles of hops and analogues thereof:

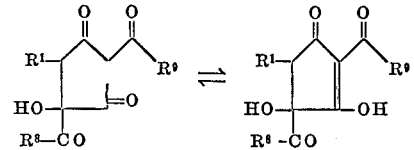

where $R^1$ is an aliphatic hydrocarbon radical which may be unsaturated, e.g. iso-amyl (3-methyl-butyl) or 3-methyl-2-butenyl, $R^8$ is also an aliphatic hydrocarbon radical which may be unsaturated, e.g. iso-amyl, 3-methyl-2-butenyl or 3-methyl-1-butenyl, and $R^9$ is an alkyl group, e.g. ethyl, iso-propyl, iso-butyl, sec-butyl or iso-amyl. Methyl jasmonate and analogues thereof:

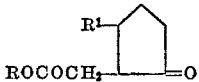

wherein $R^1$ is alkenyl and R is alkyl.

Calythrone and analogues thereof:

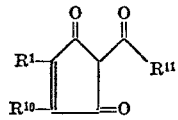

where $R^1$, $R^{10}$ and $R^{11}$ are each alkyl, groups, e.g. methyl, ethyl, propyl or iso-butyl.

The intermediates of Formula I are preferably prepared, according to the invention, from 3-substituted cyclopentan-1,2,4-triones of the formula:

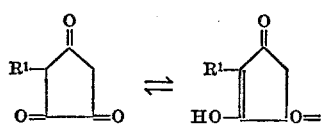

by reaction with an orthoformic acid ester of the formula $HC(OR^2)_3$:

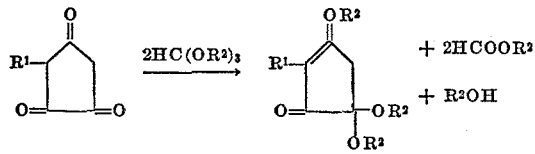

The preferred orthoformic acid ester is triethyl orthoformate and the reaction is carried under conventional esterification conditions, i.e. in the presence of an acid catalyst, e.g. p-toluenesulphonic acid, in a suitable solvent, e.g. ethanol. The orthoformic acid ester is used in at least 2 molar proportions to the cyclopentan-trione and preferably in slight excess, e.g. 2.2 to 2.6 molar proportions. The mixture is heated and the alkyl formate ($HCOOR^2$) generated is removed by distillation, until the temperature of the mixture rises to the boiling point of the solvent. The solvent is then evaporated under reduced pressure and the product recovered by conventional means, e.g. extracted with a suitable solvent (e.g. diethyl ether) washed with aqueous alkali, dried, the solvent removed by distillation and the residue recrystallized (if solid) from a suitable solvent or distilled (if liquid) under reduced pressure. Alternatively the residue may be purified by column chromatography, e.g. on alumina with chloroform as eluant.

When the group $R^1$ contains a carboxy substituent, the reaction yields a product in which the carboxyl group is esterified with $R^2$ and if it is desired to obtain the free acid, then the recovery procedure may be modified by hydrolyzing the product with only one equivalent of alkali (e.g. N/10 aqueous sodium hydroxide), acidifying carefully to about pH 6 (e.g. with phosphoric acid) and then extracting with a suitable solvent. Under these conditions only the desired trialkoxy compound is extracted, and the aqueous layer can be separated and acidified to pH 2 to yield the pentan-trione starting material, which may be recovered and re-used.

The 3-substituted cyclopentan-1,2,4-trione starting materials are, generally speaking, known compounds, but can if necessary be prepared by reaction of a compound of the formula $R^1CH_2COCH_3$ with a dialkyl oxalate in the presence of sodium tert-butoxide to yield a compound of the formula:

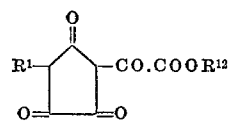

where $R^{12}$ is an alkyl group, and then hydrolyzing to remove the oxalyl ester group $—CO.COOR^{12}$. Where $R^1$ is a saturated group, acid hydrolysis can be used, but when $R^1$ is unsaturated (e.g. a 3-methyl-2-butenyl group) this may lead to bi-cyclic compounds and hydrolysis is preferably carried out in an alkaline medium using the calculated amount of alkali for hydrolysis of the oxalyl ester group.

The preparation of 3-substituted cyclopentan-1,2-diones of the Formula II, from the intermediates of Formula I, may be carried out by reduction, e.g. with lithium aluminium hydride, which results in a mixture of the desired product with the corresponding 2-substituted cyclopent-2-en-1,4-dione of the formula:

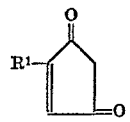

The reaction with lithium aluminium hydride may be carried out by refluxing in dry ether and the mixed product recovered by destroying the complex by addition of aqueous acid or sodium sulphate solution, extracting into ether, evaporating, hydrolyzing the residue with aqueous acid at ambient temperature to remove any enol ether groups, extracting again with ether, drying and evaporating. The cyclopent-2-en-1,4-dione may then be removed by distillation leaving the desired cyclopentan-1,2-dione as residue, or alternatively the acidic cyclopentan-1,2-dione may be extracted into aqueous alkali, acidified, extracted into ether and recovered by conventional means.

As already mentioned, 3-alkyl-cyclopentan-1,2-diones are useful per se as flavor enhancers, but they may also be used in the synthesis of jasmone and jasmone analogues, e.g. dihydro-jasmone, as described by Erickson et al. in J. Organic Chemistry, vol. 30, p. 1050 (1965).

The preparation of 2,3-substituted cyclopent-2-en-1,4-diones and their 1-ketals of the Formulae IIIa and IIIb, from the intermediates of Formula I, may be carried out by reaction with an organometallic compound containing the group $R^3$ attached to the metal atom, preferably a Grignard reagent of the formula $R^3MgX$, where X is a halogen atom, or a lithium compound $R^3Li$, followed by hydrolysis:

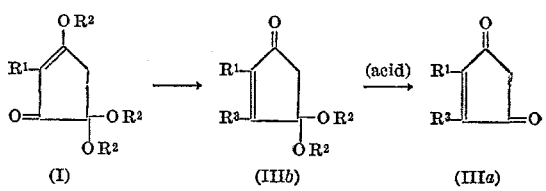

Product IIIa is formed on acid hydrolysis, but product IIIb may be isolated under mild hydrolysis conditions in some circumstances, according to the type of organometallic reagent used and the nature of the organic groups $R^1$ and $R^3$. In particular, when a Grignard reagent $R^3MgX$ is used in which $R^3$ is an alkenyl or alkynyl group or substituted derivative thereof, then sometimes a product IIIb cannot be isolated, especially when $R^1$ is small, e.g. a methyl group. On the other hand, when an organo-lithium compound, or a Grignard reagent in which $R^3$ is a saturated group, is used, then a product IIIb can be obtained by hydrolysis in water or a buffer solution at pH 7.

In this reaction, $R^3$ may be any group capable of forming an organometallic compound which will react with the keto-group of a compound of Formula I. It may therefore be, for example, an alkyl, alkenyl, alkynyl (in particular 1-alkynyl) or aryl hydrocarbon radical, any of which may be substituted with groups which do not interfere with the formation of the organometallic compound or with the subsequent reaction with the keto-group of the compound of Formula I. Thus $R^3$ may be substituted with hydroxyl or oxo groups, provided that such groups are protected by etherification or ketalization, respectively. The etherifying or ketalizing group may be one which is easily removable subsequently, if desired, e.g. the 2-tetrahydropyranyl (THP) etherifying group or the diethyl, ethylene or propylene ketalizing groups, which are easily removable by acid hydrolysis.

The nature of the invention, and the manner in which it is to be performed, is illustrated in the following examples, in which all temperatures are given in ° C.

EXAMPLE I (A) 3-methyl-cyclopentan-1,2,4-trione

Powdered sodium (161 g.; 7 moles) was added to a mixture of tert. butanol (3 liters) and dry toluene (1 liter) in a flask equipped with a stirrer, condenser and dropping funnel, and the mixture was heated under reflux with stirring until the sodium had begun to react. A mixture of butanone (252 g.; 3.5 moles) and diethyl oxalate (1127 g.; 7.7 moles) was added during 30 minutes to the refluxing suspension of sodium tert. butoxide, and after maintaining reflux for a further 5 hours, the solution was cooled and treated with concentrated hydrochloric acid (700 ml.). The precipitated sodium chloride was filtered off, and the filtrate was evaporated to small bulk under reduced pressure. The residue of crude oxalyl ester A was hydrolyzed by heating under reflux with hydrochloric acid (2.5 N; 2 liters) for 90 minutes. The solution was then cooled, concentrated under reduced pressure, and extracted with ether. The ether extract was evaporated, and water was removed from the residue by addition of benzene followed by azeotropic distillation. A small amount of oxalic acid was filtered off, and the filtrate was purified by crystallization from benzene. It had M.P. 161° (Yield, 335 g.; 76%).

(B) 2-methyl-3,5,5-triethoxy-cyclopent-2-en-1-one 3-methyl-cyclopentan-1,2,4-trione (56 g.; 0.44 mole), triethyl orthoformate (163 g.; 1.1 mole) and a catalytic amount (0.2 g.) of p-toluenesulphonic acid were dissolved in dry ethanol (1000 ml.) and the mixture was heated. The ethyl formate (B.P. 55°) generated was allowed to distil through an efficient reflux condenser, and after about 4 hours the temperature of the distillate had risen to the boiling point of ethanol. Ethanol was then removed by distillation under reduced pressure, the residue was extracted with ether, and the ether layer was washed with aqueous sodium carbonate solution (5%) and dried ($Na_2SO_4$). The ether was then distilled off and the residue was warmed with isooctane (800 ml.). After removal by filtration of some undissolved material, the isooctane solution deposited crystals of the desired product, M.P. 60°. (Yield 90 g.; 78%. Hydrolysis of the mother liquor with dilute aqueous sodium hydroxide yielded an appreciable amount of trione starting material, so that the absolute yield was rather higher.)

*Analysis.*—Found (percent): C, 63.3; H, 8.80. Required for $C_{12}H_{20}O_4$ (percent); C, 63.1; H, 8.84.

EXAMPLE II

Following generally the procedure of Example I, the 3,5,5-trialkoxy-cyclopent-2-en-1-ones set out in the following table are prepared from the appropriate cyclopentan-1,2,4-triones:

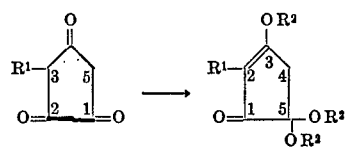

| $R^1$ | $R^2$ | M.P. | Analysis, percent [1] | |
|---|---|---|---|---|
| | | | C | H |
| A.... $C_2H_5-$ | $-C_2H_5$ | 62–63°... | 64.58 (64.41) | 9.12 (9.15) |
| B.... $(CH_3)_2CH \cdot CH_2CH_2-$ | $-C_2H_5$ | 69–71°... | 67.83 (67.55) | 10.21 (9.93) |
| C.... $(CH_3)_2C=CH \cdot CH_2-$ | $-C_2H_5$ | Oil | | |
| D.... $CH_3-$ | $-CH_3$ | Oil [2] | 58.05 (58.03) | 7.57 (7.58) |
| E.... $HO_2C \cdot (CH_2)_6-$ | $-C_2H_5$ | Oil [3] | | |
| F.... $CH_3OCH_2CH_2-$ | $-C_2H_5$ | Oil | 62.05 (61.78) | 8.94 (8.82) |
| G.... $Ph_2C=CHCH_2-$ | $-C_2H_5$ | | | |
| H.... $CH_3OCH_2(CH_2)_6-$ | $-C_2H_5$ | | | |

[1] Required figures in brackets.
[2] B.P. 110°/0.5 mm.
[3] Obtained by the modified procedure for carboxy-substituted compounds already described.

EXAMPLE III (A) 2-allyl-3-methyl-cyclopent-2-en-1,4-dione

A mixture of allyl bromide (180 g.; 1.5 mole) and 2-methyl-3,5,5-triethoxy-cyclopent-2-en-1-one (57 g.; 0.25 mole) in dry ether (500 ml.) was added dropwise to a stirred suspension of magnesium (36 g.; 1.5 mole) in dry ether (100 ml.). The mixture was heated under reflux for 10 hours, and was then acidified with 0.1 N cold sulphuric acid. The ethereal layer was separated, washed (water) and dried ($Na_2SO_4$). After evaporation of the ether, the residue was distilled (B.P. 94° C./0.05 mm. Hg) as a pale yellow oil (32.6 g.; 87%).

*Analysis.*—Found (percent): C, 71.85; H, 6.55. Required for $C_9H_{10}O_2$ (percent): C, 72.00; H, 6.67.

(B) 2-methyl-3-n-pentyl-cyclopent-2-en-1-1,4-dione 2-methyl-3,5,5-triethoxy-cyclopent-2-en-1-one (4.56 g.; 0.02 mole) was added to n-pentylmagnesium bromide (0.04 mole) in dry ether (50 ml.) at 0°. The mixture refluxed for 8 hours and then poured into a saturated aqueous ammonium chloride solution. After extraction into ether and evaporation of the solvent, the residue was heated to 70° in 10% aqueous sulphuric acid solution for 15 minutes. The product was then extracted into ether, recovered as in Example III–A and distilled to give 2.87 g. of a yellow oil, B.P. 70–73°/0.2 mm. (80% yield).

*Analysis.*—Found (percent): C, 73.7; H, 8.62. Required for $C_{11}H_{16}O_2$ (percent): C, 73.3; H, 8.94.

EXAMPLE IV (A) 2,3-dimethyl-cyclopent-2-en-1,4-dione

A solution of 2-methyl-3,5,5-triethoxy-cyclopent-2-en-1-one (11.4 g.) in dry ether (75 ml.) was added to a stirred solution of methyl lithium (from 11.3 g. methyl iodide and 1.05 g. lithium) in dry ether (80 ml.) at −10°. The reaction mixture, allowed to warm to room temperature, was refluxed for 13 hours and was then acidified with cold diluted sulphuric acid. The ether layer was separated, washed with water and dried (sodium sulphate). After evaporation of the ether, the residue was distilled (B.P. 70°/18 mm.) as a pale yellow oil which solidified (M.P. 47–48°; yield 5.7 g.; 94%). The product was crystallized from n-pentane.

*Analysis.*—Found (percent): C, 67.4; H, 6.86. Required for $C_7H_8O_2$ (percent): C, 67.7; H, 6.50.

(B) 2-(n-hex-1-ynyl)-3-methyl-cyclopent-2-en-1,4-dione

Methyl iodide (26.6 g.; 0.19 mole) dissolved in dry ether (80 ml.) was added dropwise with stirring to fine-cut lithium metal (2.5 g.; 0.38 mole) in dry ether (70 ml.) at −10ö C. under a nitrogen atmosphere. When (after about 12 hours) all the lithium had reacted, freshly distilled 1-hexyne (17.7 g.; 0.21 mole) in dry ether (70 ml.) was added with stirring at 0° C. during 1 hour. The mixture was then heated under reflux for 1 hour. 2-methyl - 3,5,5 - triethoxy-cyclopent-2-en-1-one (14.25 g.; 0.063 mole) in dry ether (60 ml.) was added over 1 hour to the stirred solution at room temperature. After leaving overnight at room temperature, the mixture was heated under reflux for 3 hours, cooled to room temperature, and poured into a mixture of ice and dilute hydrochloric acid (10%). The ether layer was separated, washed (5% aqueous sodium carbonate), dried ($Na_2SO_4$) was filtered. Evaporation of the ether followed by steam distillation gave the product M.P, 40° C. (Yield, 65%).

(C) 4,4-diethoxy-3-(n-hex-1-ynyl)-2-methyl-cyclopent-2-en-1-one (1-diethyl ketal of (B))

The method for the preparation of (B) was repeated as far as the addition of 2-methyl-3,5,5-triethoxy-2-cyclopentane-1-one and leaving overnight. The mixture was then poured into an aqueous phosphate buffer solution at pH 7 and extracted with ether. After drying ($Na_2SO_4$) and removal of the ether, the residue was distilled to yield 12.2 g. (80%) of the 4,4-diethoxy product, B.P. 106–108° at 0.01 mm. Hg.

EXAMPLE V

Following essentially the procedures of Examples III-A, III-B, IV-A or IV-B, and using ether or tetrahydrofuran as reaction medium, the 2,3-disubstituted cyclopent-2-en-1,4-diones set out in the following table and prepared from the appropriate triethoxy compound and organometallic reagents.

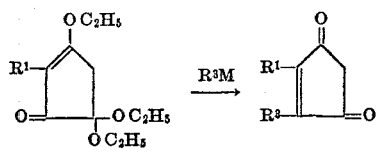

| | $R^1$ | $R^3$ | M | B.P. | Analysis, percent C | H |
|---|---|---|---|---|---|---|
| A | $CH_3$ | $CH_3$ | MgBr | 70°/18 mm | 67.4 (67.7) | 6.86 (6.50) |
| B | $CH_3$ | $C_2H_5$ | MgBr | 87°/4 mm | 69.6 (69.5) | 7.10 (7.29) |
| C | $CH_3$ | $n-C_3H_7$ | MgBr | | | |
| D | $CH_3$ | $n-C_4H_9$ | MgBr | | | |
| E | $CH_3$ | $n-C_5H_{11}$ | MgBr | 70–73°/0.2 mm | 73.7 (73.3) | 8.62 (8.94) |
| F | $CH_3$ | $CH_2=CH-CH=CH-CH_2-$ | MgBr | | | |
| G | $CH_3$ | $CH_2=CH-C\equiv C-CH_2-$ | MgBr | | | |
| H | $CH_3$ | $CH_3-C\equiv C-CH_2-$ | MgBr | 90°/0.001 mm | | |
| J | $CH_3$ | $n-C_6H_{13}-C\equiv C-$ | MgBr | 134°/0.1 mm | 76.9 (77.1) | 8.35 (8.25) |
| K | $CH_3$ | $\langle \rangle-C\equiv C-$ | Li | | | |
| L | $CH_3$ | $n-C_3H_7-CH-C\equiv C-$ <br> $\quad\quad\quad\quad\ \ \|$ <br> $\quad\quad\quad\quad\ O-THP*$ | MgBr | (See detailed preparation below) | | |
| M | $CH_3$ | $n-C_5H_{11}-CH-C\equiv C-$ <br> $\quad\quad\quad\quad\ \ \|$ <br> $\quad\quad\quad\quad\ O-THP*$ | MgBr | | | |
| N | $CH_3$ | $CH_2O$ <br> $\quad\quad\ \searrow$ <br> $\quad\quad\quad CH-CH_2-CH_2-$ <br> $\quad\quad\ \nearrow$ <br> $CH_2O$ | MgBr | | | |
| P | $CH_3$ | $C_2H_5O$ <br> $\quad\quad\ \searrow$ <br> $\quad\quad\quad CH-C\equiv C-$ <br> $\quad\quad\ \nearrow$ <br> $C_2H_5O$ | Li | | | |
| Q | $(CH_3)_2CHCH_2CH_2-$ | $CH_3-$ | Li | | | |
| R | $(CH_3)_2CHCH_2CH_2-$ | $n-C_4H_9-C\equiv C-$ | Li | | | |
| RR | $(CH_3)_2CHCH_2CH_2-$ | $n-C_6H_{13}-C\equiv C-$ | MgBr | 85°/0.02 mm | 78.1 (78.8) | 9.65 (9.47) |
| S | $HOOC-(CH_2)_5-CH_2-$ | $n-C_4H_9-C\equiv C-$ | MgBr | | | |
| T | $HOOC-(CH_2)_5-CH_2-$ | $\langle \rangle-C\equiv C-$ | MgBr | | | |
| U | $HOOC-(CH_2)_5-CH_2-$ | $n-C_3H_7-HC-C\equiv C-$ <br> $\quad\quad\quad\quad\ \ \|$ <br> $\quad\quad\quad\quad\ O-THP*$ | MgBr | | | |
| V | $HOOC-(CH_2)_5-CH_2-$ | $n-C_5H_{11}-HC-C\equiv C-$ <br> $\quad\quad\quad\quad\ \ \|$ <br> $\quad\quad\quad\quad\ O-THP*$ | MgBr | | | |
| VV | $HOOC(CH_2)_5-CH_2-$ | $n-C_6H_{13}-C\equiv C-$ | MgBr | | | |
| W | $CH_3OCH_2CH_2-$ | $n-C_5H_{11}-HC-C\equiv C-$ <br> $\quad\quad\quad\quad\ \ \|$ <br> $\quad\quad\quad\quad\ O-THP*$ | Li | | | |
| WW | $CH_3OCH_2CH_2-$ | $n-C_6H_{13}-C\equiv C-$ | MgBr | 140°/0.1 mm | 72.85 (73.3) | 8.73 (8.40) |
| X | $CH_3OCH_2CH_2-$ | $C_2H_5-O-C\equiv C-$ | Li | | | |
| Y | $CH_3OCH_2CH_2-$ | $CH_3CH_2CH=CHCH_2-$ | MgBr | | | |
| Z | $(CH_3)_2C=CH-CH_2-$ | $CH_3-$ | Li | | | |
| AA | $(CH_3)_2C=CH-CH_2-$ | $iso-C_4H_9-C\equiv C-$ | Li | | | |
| BB | $CH_3-$ | $CH_3OCH_2-$ | MgCl | | | |
| CC | $(C_6H_5)_2C=CH-CH_2-$ | $CH_3OCH_2-$ | mgCl | | | |
| DD | $CH_3OCH_2(CH_2)_3CH_2-$ | $n-C_6H_5-C\equiv C-$ | MgBr | | | |

* Represents 2-tetrahydro-pyranyl.

EXAMPLE V (L)

2-(3-[2-tetrahydropyranyl]oxy-hex-1-ynyl)-3-methyl-cyclopent-2-en-1,4-dione

To a solution of ethyl mangesium bromide (0.2 mole) in 170 ml. of tetrahydrofuran was added 3-[2-tetrahydropyranyl]oxy-1-hexyne (0.2 mole) in 40 ml. of tetrahydrofuran over a period of 1 hour, and the mixture boiled for 1 hour, liberating ethane and forming the Grignard reagent 3-[2-tetrahydropyranyl]-oxy-hex-1-ynyl magnesium bromide. 2 - methyl-3,5,5-triethoxy-cyclopent-2-en-1-one (0.1 mole) was then added in 50 ml. tetrahydrofuran over a period of 1 hour and the mixture refluxed for 3 hours. After hydrolysis with ice and dilute HCl, the mixture was extracted with ether, dried ($Na_2SO_4$) and evaporated to yield the product.

The product of this example, and those of Example V (M), (U), (V) and (W) may be hydrolysed to the corresponding hyroxy compounds, e.g. as follows:

The product of Example V (L) was dissolved in 700 ml. methanol, p-toluene sulphonic acid catalyst was added, and the mixture boiled for 15 minutes under reflux. The p-toluene sulphonic acid was neutralized with solid potassium carbonate powder and the solvent evaporated off under vacuum. The residue was dissolved in ether, washed with water, dried over $Na_2SO_4$ and purified on a silica column to yield 65% (based on the 2-methyl-3,5,5-triethoxy-cyclopent-2-en-1-one starting material) of 2 - (3 - hydroxy-hex-1-ynyl)-3-methylcyclopent-2-en-1,4-dione.

*Analysis.*—Found (percent): C, 69.4; H, 7.17. $C_{12}H_{14}O_3$ requires (percent): C, 70.0; H, 6.80.

Similarly, the products of Example V (N) and (P) are hydrolyzed to the corresponding aldehydes.

EXAMPLE VI

This example illustrates the use for synthetic purposes of the product of Example IIIA, made according to the method of the invention.

(A) 2-allyl-4-hydroxy-3-methyl-cyclopent-2-en-1-one (allethrolone)

Zinc dust (30 g.; 0.5 mole) was added in portions during 20 minutes to a stirred solution of 2-allyl-3-methyl-cyclopent-2-en-1,4-dione (15 g.; 0.1 mole) in methylene chloride (500 ml.) and acetic acid (200 ml.) at —20° C. The mixture was stirred at —20° C. for a further 90 minutes, and the solvents were then removed under reduced pressure. Ether (100 ml.) was added to the residue, and the solution was filtered to remove zinc. The filtrate was washed (10% aqueous sodium carbonate), dried ($MgSO_4$) and evaporated under reduced pressure. The residue (14.7 g.) was almost pure allethrolone, and was used without further purification in the next stage. Distillation of a portion of the residue gave pure allethrolone (B.P. 85° C. at 0.05 mm. Hg).

(B) Allethrin

Chrysanthemic acid chloride (2.18 g.; 0.011 mole) in dry ether (25 ml.) was added dropwise to a cooled (ice) stirred solution of allethrolone (1.52 g.; 0.01 mole) and pyridine (0.8 g.; 0.01 mole) in dry ether (25 ml.). The mixture was then heated under reflux for 2 hours, cooled, filtered from pyridine hydrochloride, washed (10% aqueous sodium bicarbonate) and dried ($Na_2SO_4$). Solvent was removed under reduced pressure, and the residue was distilled to give the insecticide allethrin (2.3 g.; B.P. 140° at 0.01 mm. Hg) as a pale yellow oil.

EXAMPLE VII

The following are examples of the production of 3-substituted cyclopentane - 1,2-diones by reduction of the novel intermediates of the invention:

(A) 3-methyl-cyclopentan-1,2-dione

To a suspension of lithium aluminium hydride (0.379 g.) in dry ether was added a solution of 2-methyl-3,5,5-triethoxy-cyclopent-2-en-1-one (as prepared in Example I; 2.28 g.) in dry ether and the mixture was refluxed for 2 hours. Saturated sodium sulphate solution was added to destroy the organometallic complex formed and the mixture then extracted twice with ether. The separated ether layers were combined and evaporated, and the residue hydrolyzed with 2 N hydrochloric acid (15 minutes at 75°) to remove any ether groups. After extracting again with ether, drying ($Na_2SO_4$) and evaporation, the product (which was a mixture of the 1,2- and 1,4-diones) was distilled to yield first the 1,4-dione (B.P. 86–89°/13 mm.) and then the desired product, which solidified and was re-crystalised from water (M.P. 105°).

(B) 3-ethyl-cyclopenten-1,2-dione

This compound was prepared by the same method as (A) of this example, using 2-ethyl-3,5,5-triethoxy-cyclopent-2-en-1-one (prepared as in Example II) as starting material. The product had a boiling point of 106°/15 mm.

The following examples illustrate the use for synthetic purposes of various products of Examples IV and V.

EXAMPLE VIII (A) 2-(n-hex-1-ynyl)-4-hydroxy-3-methyl-cyclopent-2-en-1-one

The product of Example IV (C) (0.024 mole) dissolved in ethanol (150 ml.) was cooled in a ice bath and sodium borohydride (4.5 g.) in ethanol (50 ml.) was added. Water (30 ml.; buffered to pH 8) was added with stirring during a period of 1 hour, the mixture allowed to come to room temperature and stirring continued for a further hour. After acidifying the dilute HCl and stirring for 30 minutes, the ethanol was evaporated under reduced pressure, the temperature being kept below 40°. Water was then added and the mixture extracted with ether, the ether layer separated and evaporated to yield the product in 70% yield (B.P. 120–125°/0.01 mm.).

(B) 1-(n-hex-1-enyl)-2,4-dihydroxy-5-methyl-cyclopentane

The product of A (1.09 g.) in 9 ml. of dry ethanol was added to 150 ml. of liquid ammonia (distilled from sodium) and 25 ml. dry tetrahydrofuran added. Potassium (1.78 g.) was then added in small pieces and after 1 hour excess potassium was destroyed by adding ammonium chloride. The ammonia was then evaporated, ether was added and the ammonium and potassium chlorides filtered off. The product (a light brown oil) was purified on a silica column to give the desired compound in 70% yield on elution with a 9:1 ether:ethanol mixture.

The product of (B) may then be converted by known methods to the corresponding 1-(3-hydroxy-hex-1-enyl) compound which is closely related structurally to the prostaglandins.

By using as starting materials compounds in which $R^1$ is 6-carboxy-hexyl and $R^3$ is n-oct-1-ynyl, prostaglandin compounds themselves are obtained, or stereo-isomers thereof.

EXAMPLE IX 2-(3-hydroxy-hex-1-ynyl)-4-hydroxy-3-methyl-cyclopent-2-en-1-one

The hydrolyzed product of Example V (L) (6 g.), ethylene glycol (18 g.) and 100 ml. of dry benzene were refluxed for 20 hours in the presence of p-toluene sulphonic acid as catalyst. Water was removed via a Dean & Stark apparatus and the residue cooled, separated from excess glycol and neutralized with powdered sodium carbonate. Filtration and evaporation under reduced pressure yield the ethylene 1,4-diketal, which was dissolved in 200 ml. ether and hydrolyzed to the 1-monoketal by adding 20 ml. 2 N HCl and stirring for 1 hour at room temperature. The ethylene 1-ketal (6 g.) was recovered from the ether layer and reduced with sodium borohydride and hydrolyzed (as described in Example VIII-A) to give the desired product in 78% yield.

The product of this example may then readily be reduced to 2-(3-hydroxy-hex-1-enyl)-2,4-dihydroxy-5-methyl-cyclopentane.

As mentioned already in connection with Example VIII-B, this compound is closely related to the prostaglandins, and, by using as starting material the product of Example V (V), in which $R^1$ is 6-carboxy-hexyl and $R^3$ is 3-tetrahydrofurfuryl-oxy-oct-1-ynyl, prostaglandins themselves may again be obtained.

EXAMPLE X 4-hydroxy-3-(2-methoxyethyl)-2-(3-[2-tetrahydropyranyl]oxy-oct-2-ynyl)-cyclopent-2-en-1-one The product of Example V (W) is reduced with zinc and acetic acid, by the method of Example VI-A to yield this compound, which may be oxidized to the corresponding 3-carboxymethyl compound and then reduced with sodium in liquid ammonia to yield 2,4-dihydroxy-5-(3-[2-tetrahydropyranyl]oxy-oct-2-ynyl) cyclopentyl acetic acid. This last compound is an important intermediate in a known route for the synthesis of prostaglandins having a 6-carboxy-hex-2-enyl group $R^1$.

EXAMPLE XI 4-hydroxy-2-methoxymethyl-3-(3,3-diphenyl-allyl) cyclopent-2-en-1-one The product of Example V (CC) is reduced with zinc and acetic acid by the method of Example VIA to yield this compound, which may be oxidized to the corresponding 3-carboxymethyl compound.

The latter compound, which may also be described as 2 - hydroxy-5-methoxymethyl-4-oxo-cyclopent - 1 - enyl acetic acid, is also an important intermediate for the synthesis of prostaglandins.

EXAMPLE XII 5-(3-methylbutyryl)-2,3-dimethyl-cyclopent-2 - en - 1, 4-dione (Calythrone)

To 3-methylbutyric acid (6 ml.) and dichloroethane (3 ml.), saturated with boron trifluoride, was added dropwise a mixture of the product of Example IV-A (1.8 g., 0.015 mole), 3-methylbutyric anhydride (6 g., 0.03 mole) and dichloroethane (3 ml.) at 0°. After 30 minutes at 0° the mixture was heated to 40° for 3 hours. The dark red mixture was then poured on to ice (100 g.) and extracted with ether. Evaporation of the solvent from the extract, followed by chromatography of the residue on silicagel with isooctane-ether (9:1) gave the pure product, which was distilled as a yellow oil (B.P. 130°/10 mm.; yield 1.35 g.; 45%). The copper salt had M.P. of 208°.

Similarly, other 2,3 - disubstituted-cyclopent-2-en-1,4-diones prepared as in Examples IV and V are acylated to yield 5-acyl derivatives thereof. For example, the product of Example V (AA) may be acylated to yield compounds of the formula:

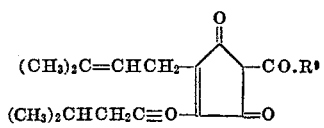

where $R^9$ is as previously defined. Such compounds are intermediates useful in the synthesis of hop bittering principles. For instance they may be hydrated to yield compounds of the formula:

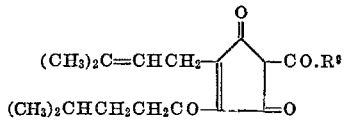

and then oxidized to compounds of the formula:

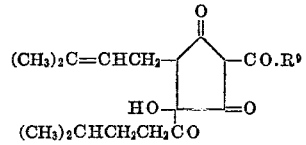

which are chemically closely related to the isohumulones.

What is claimed is:
1. A compound having the formula

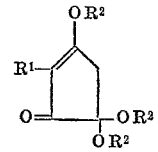

wherein $R^1$ is selected from the group consisting of carboxy-lower alkyl and alkenyl, said lower alkyl and alkenyl having 1 to 7 carbon atoms, and $R^2$ is methyl or ethyl.

2. The compound of claim 1 wherein $R^1$ is 6-carboxyhexyl, and $R^2$ is ethyl.

3. A method of preparing a compound having the formula

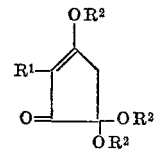

wherein $R^1$ is selected from the group consisting of carboxy-lower alkyl and alkenyl; and wherein $R^2$ is methyl, or ethyl, which method comprises reacting a compound of the formula

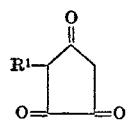

with at least 2 molar proportions of an orthoformic acid ester of the formula $HC(OR^2)_3$ in the presence of an acid catalyst, heating to evaporate the formic acid ester $HCOOR^2$, hydrolyzing the resulting product with an equivalent of alkali, acidifying to a pH of about 6, and extracting with a suitable solvent.

References Cited

UNITED STATES PATENTS 3,558,682   1/1971   Pappo et al. _____ 260—468

OTHER REFERENCES

Vanderwalle et al. Bull. Soc. Chim. Belgium, 79, 403, (1970).

LORRAINE A. WEINBERGER, Primary Examiner

R. GERSTL, Assistant Examiner

U.S. Cl. X.R.

260—469, 514 D, 586 R, 590; 424—305, 306, 317, 331